United States Patent
Li et al.

(10) Patent No.: US 6,763,353 B2
(45) Date of Patent: Jul. 13, 2004

(54) REAL TIME BUSINESS PROCESS ANALYSIS METHOD AND APPARATUS

(75) Inventors: Hui Li, Union City, CA (US); Shelly Xiaolei Qian, Cupertino, CA (US)

(73) Assignee: Vitria Technology, Inc., Sunnyvale, CA (US)

( * ) Notice: Subject to any disclaimer, the term of this patent is extended or adjusted under 35 U.S.C. 154(b) by 466 days.

(21) Appl. No.: 09/984,975

(22) Filed: Oct. 31, 2001

(65) Prior Publication Data

US 2002/0116362 A1 Aug. 22, 2002

Related U.S. Application Data

(63) Continuation-in-part of application No. 09/206,655, filed on Dec. 7, 1998, and a continuation-in-part of application No. 09/206,664, filed on Dec. 7, 1998, now Pat. No. 6,338,055, and a continuation-in-part of application No. 09/206,663, filed on Dec. 7, 1998.

(60) Provisional application No. 60/307,363, filed on Jul. 25, 2001.

(51) Int. Cl.[7] .......................... G06F 17/30; G06F 17/60
(52) U.S. Cl. .................. 707/4; 707/2; 707/3; 707/5; 705/1; 705/7; 709/310; 718/101
(58) Field of Search .................. 707/2, 3, 4, 5, 707/102, 100, 1; 705/1, 7; 709/310; 718/101

(56) References Cited

U.S. PATENT DOCUMENTS

| | | | |
|---|---|---|---|
| 5,331,543 A | | 7/1994 | Yajima et al. |
| 5,544,355 A | * | 8/1996 | Chaudhuri et al. ............ 707/2 |
| 5,557,798 A | | 9/1996 | Skeen et al. |
| 5,574,900 A | * | 11/1996 | Huang et al. ................... 707/1 |
| 5,630,069 A | * | 5/1997 | Flores et al. .................... 705/7 |
| 5,666,526 A | * | 9/1997 | Reiter et al. .................... 707/2 |
| 5,666,528 A | * | 9/1997 | Thai ........................... 707/102 |
| 5,727,196 A | * | 3/1998 | Strauss et al. .................. 707/2 |
| 5,819,255 A | * | 10/1998 | Celis et al. ..................... 707/2 |
| 5,822,749 A | * | 10/1998 | Agarwal ........................ 707/2 |
| 5,842,196 A | * | 11/1998 | Agarwal et al. ................ 707/2 |
| 5,884,317 A | | 3/1999 | Cline et al. |
| 5,926,637 A | | 7/1999 | Cline et al. |
| 5,960,421 A | | 9/1999 | Cline et al. |
| 6,006,277 A | | 12/1999 | Talati et al. |
| 6,009,265 A | * | 12/1999 | Huang et al. ................... 707/3 |
| 6,021,405 A | * | 2/2000 | Celis et al. ..................... 707/2 |
| 6,026,390 A | * | 2/2000 | Ross et al. ..................... 707/2 |
| 6,038,601 A | | 3/2000 | Lambert et al. |
| 6,058,413 A | * | 5/2000 | Flores et al. ................. 718/101 |
| 6,115,744 A | | 9/2000 | Robins et al. |
| 6,128,742 A | | 10/2000 | Felt |
| 6,216,151 B1 | | 4/2001 | Antoun |
| 6,236,999 B1 | | 5/2001 | Jacobs et al. |
| 6,253,257 B1 | | 6/2001 | Dundon |
| 6,308,178 B1 | * | 10/2001 | Chang et al. ............... 707/100 |
| 6,338,055 B1 | * | 1/2002 | Hagmann et al. .............. 707/2 |
| 6,349,298 B1 | | 2/2002 | Malone et al. |
| 6,408,291 B1 | * | 6/2002 | Skeen et al. .................... 707/2 |
| 2002/0038228 A1 | | 3/2002 | Waldorf et al. |
| 2002/0091989 A1 | | 7/2002 | Cole et al. |
| 2003/0033437 A1 | * | 2/2003 | Fischer et al. ............... 709/310 |

FOREIGN PATENT DOCUMENTS

| | | |
|---|---|---|
| EP | 0 438 168 A2 | 7/1991 |
| WO | WO 00/72183 A2 | 11/2000 |
| WO | WO 01/27762 A1 | 4/2001 |
| WO | WO 01/75747 A1 | 10/2001 |

* cited by examiner

*Primary Examiner*—Frantz Coby
(74) *Attorney, Agent, or Firm*—Nixon Peabody, LLP; Marc S. Kaufman

(57) ABSTRACT

A method for monitoring a business process model in which at least one business process object transitions between states. A query having at least one state for the business process object and at least one time-based condition is defined. The query is applied to the business process objects that have changed since a last query application step as a result of execution of the business process model. Events are published when the results of the query are different from previous results of the query. The time based conditions can include conditions compared to actual time and can aggregated values of attributes of plural business process objects and current time.

35 Claims, 4 Drawing Sheets

Fig. 4

| Definition Name | Type or Parameter List |
|---|---|
| ⊟ add | LongResponses obj |
|    ⊟ obj | LongResponses |
|       QuoteID | string |
|       ProductID | long |
|       ProductName | string |
| ⊟ change | LongResponses oldObj, LongResponses newObj |
|    ⊞ oldObj | LongResponses |
|    ⊞ newObj | LongResponses |
| ⊟ delete | LongResponses obj |
|    ⊟ obj | LongResponses |
|       QuoteID | string |
|       ProductID | long |
|       ProductName | string |

REAL TIME BUSINESS PROCESS ANALYSIS METHOD AND APPARATUS

RELATED APPLICATION DATA

This application is a continuation-in-part of application Ser. Nos. 09/206,655 filed on Dec. 7, 1998, 09/206,664 filed on Dec. 7, 1998 now U.S. Pat. No. 6,338,055, and 09/206,663 filed on Dec. 7, 1998, the disclosures of which are incorporated herein by reference. This application is also related to the application concurrently filed herewith and entitled Integrated Business Process Modeling Environment and Models Created Thereby, the disclosure of which is also incorporated herein by reference. This application also claims benefit of U.S. provisional patent application Ser. No. 60/307,363 filed on Jul. 25, 2001.

BACKGROUND

The invention relates generally to business processes and more specifically to a method and apparatus for querying the status of business process objects in a time-based manner.

It is well known to automate various business systems, such as Customer Relations Management (CRM), Enterprise Resource Planning (ERP), accounting, inventory control, order processing and other systems. Historically, such systems were each handled by dedicated software applications that did not integrate well with each other. Early software applications for automating business systems were designed to run independently, with no interaction between various systems. Such applications were custom built for a specific need being addressed and often utilized proprietary protocols. Dedicated "point to point" connections were developed to permit each such system to communicate with another such system. For example, an inventory control system may exchange data with an accounting system through a customized software interface. However, as the number of systems increases, the quantity and complexity of point to point connections also increase. Further, point to point connections are rather inflexible and do not facilitate reconfigurations of systems to accommodate changing business models.

The concept of "Enterprise Application Integration" (EAI) refers to the sharing of data throughout applications and data sources in an organization. As enterprises grow and require increased flexibility of data sharing throughout various systems, EAI is used to streamline processes and keep all the elements of the enterprise interconnected. EAI can include database linking, application linking, and data warehousing.

Various systems for accomplishing EAI are well known. For example, Service Oriented Architectures (SOA), in which a common set of services are exposed by different layers, are known. Also, Event Oriented Architectures (EOA) in which a publish/subscribe messaging system is used to change the states of activities based on events, is known. Further, standard connectivity protocols and message formats such as Remote Method Invocation (RMI) and extensible Markup Language (XML) have been established to facilitate EAI.

The concept of "value chains," i.e., a series of business activities that create value, has become a useful paradigm for analyzing and improving the efficiency of businesses. Such activities include business processes, such as order entry, shipping, invoicing, and the like. Value chains are dependent on the internal business processes of a company, the business processes of trading partners, such as suppliers, and the relationship between the company and trading partners. It has become popular to experiment with and change value chains to optimize efficiency and profitability. Such change requires reconfiguration of business systems and the integration therebetween. EAI has facilitated such reconfiguration of business systems.

It is also known to provide an object oriented environment for modeling and configuring the above-described integration of various applications in a graphical manner to further facilitate configuration and reconfiguration of business systems. For example, the BusinessWare™ modeling environment sold by Vitria™ Technology, Inc. permits modeling of the integration of applications in a graphical manner by using "business process models," a technique becoming known as "business process management" (BPM). Business process models are state machines that model business processes at a semantic level and define an executable specification for the underlying business logic. Each business process model defines plural states and transitions required to move between states. An executing instance of a business process model is known as a "business process object." Business process models can be represented graphically and configured and manipulated in a graphical environment, such as BusinessWare™.

Of course, it is desirable to make business process information available for analysis. Typically information relating to business processes should be available to persons with many different needs. For example, a wholesale business may order goods from many different manufacturers, warehouse the goods at different places (often in different environments), receive orders arriving at many different times from plural customers, receive payments in plural forms, ship products to customers using plural shipping channels, and track accounts relating to suppliers and customers. The information relating to these business processes that is useful to a shipping clerk may be entirely different from information relating to the same business processes that is useful to a warehouse supervisor, a purchasing agent, or an accountant.

These various personnel typically obtain the information that they require by searching for that information in a relational database. A relational database stores historical data in multiple tables in the long term memory of a computer. Personnel typically enter the data from summations into computer displayed forms provided by the database program. The database program stores the data entered in the appropriate tables. Each table includes rows of records with many different fields each holding information defining the record. The different tables in a relational database often have one or more fields which are identical to fields in other tables and provide a link by which data in one table may be related to data in another table.

When an automated process, employee or other authorized person desires information to carry out a particular job, the person or process directs a query to the database. A query causes the software to select information from one or a number of different tables, often to manipulate that information in some manner, and to return the results of the query. A query allows an employee to provide very complicated criteria to the database accessing software. The response to a query can thus include results from very sophisticated manipulations of historical data relating to business processes.

Queries to a typical database may be devised to provide the particular information that each individual person or group of persons needs. Because queries customized, hundreds and often thousands of different individual queries are likely to be submitted continuously to a database in a large business. Each time a person or automated process needs information from a database on which to base a decision, a new query must be submitted even though the query may be identical to a query previously submitted. Each individual query is run to completion by the computer executing the database software. As a business grows larger, queries tend to occupy more and more of the time available to the computer running the database. In fact, a large relational database may often become unable to respond effectively to the business queries it receives.

Although many business operations are satisfied by the historical data provided by a typical relational database and are able to cope with slow access speeds, there are any number of business processes which only function optimally if those making decisions about the processes are provided immediately with information related to the operation and status of business processes. Manufacturing processes are typical of operations which require real-time monitoring. Manufacturing processes are often handled by computer systems dedicated to the individual processes to avoid the above-noted problems associated with the use of an enterprise wide relational database system. Many other business processes benefit greatly if business decisions can be made in real time in response to real-time events. For example, if a business furnishes trucks to pick up the goods it purchases, a last minute change in the quantity or character of items which have been purchased may require a larger truck and the additional expense of an extra trip if not discovered before a first truck has been dispatched. The availability of real-time information can significantly affect the profitability and responsiveness of a business. Further, it has become popular to provide guaranteed minimal levels of service through service level agreements. Ideally, service levels of business processes must be monitored in real time to enforce service level agreements and take corrective or remedial action when a minimum service level has been violated.

As noted above, a typical relational database is not suited to produce up-to-date results from continually changing data because a database usually contains only historical data. Consequently, the entire design of databases has been organized to optimize the processes by which the many tables of large databases are searched in response to individual queries devised to provide this historical data to users and processes. Although relational databases have some functions which allow responses to real-time events, these functions are so limited in nature that they do not provide a useful solution where real-time decisions are necessary.

For example, some databases provide what are referred to as "triggers." A trigger can be coded into the software to execute a process in response to some change which occurs to some data in the database. Such a process must be precoded into the software and is not flexible to suit changing circumstances, such as a change in the value chain or service level agreement. Moreover, trigger processes cannot be used on a large scale to respond to real-time events. A trigger process runs serially like other processes on the computer. Consequently, if constantly occurring trigger processes were to be used for a variety of purposes, the entire database would simply slow to a halt. Further, database triggers are executed in response to changes made in the relational database data and are not automatically reevaluated based on the passage of time.

Another type of system for providing information is referred to as an event service. A method used by event service systems to respond to real-time events involves what are called filters or event processing. Filters are used to look for the occurrence of events which meet particular criteria. However, filters used by prior art event services are able to respond only to criteria which exist in the event itself and cannot provide more sophisticated functions. For example, if an event indicates that a package is arriving from a manufacturer containing an amount of some goods, only the data actually in the event can be utilized by the filter. The manufacturer, the goods, the amount of goods, and the time of arrival can be provided to persons interested in the results of the filter, but no other information already in any database can be associated with the event data by the filter. None of the sophisticated processes available to a database such as relating values in different tables which pertain to the package can be carried out. No historical data related to the manufacturer, the goods, or the amounts of the goods can be determined. Thus, a filter could not be used to determine whether an additional truck was necessary in the previously-mentioned case because historical data could not be combined with event data by an event service. There are at present no systems for providing immediate results to multi-dimensional sophisticated queries for business process events occurring in real time.

SUMMARY OF THE INVENTION

An object of the invention is to improve the access to business process data. In order to achieve this and other objects, a first aspect of the invention is a method for monitoring a business process model in which at least one business process object transitions between states. The method comprises defining a process query having at least one state for the business process object and at least one time-based condition, applying the process query to business process objects that have changed, publishing events when the results of a query are different from results of a previous query, and sending the events to a target process.

A second aspect of the invention is a computer architecture for monitoring a business process model in which at least one business process object transitions between states. The architecture comprises an execution engine configured to execute business process models, and an analyzer engine configured to monitor changes of business process objects effected by the execution engine. The analyzer engine applies one or more queries to the collection and outputs events based on time-based conditions of the queries.

A third aspect of the invention is a computer readable media containing instructions for operation of a computer. The instructions comprise instructions for monitoring a business process model in which at least one business process object transitions between states, instructions for defining a process query having at least one state for the business process object and at least one time-based condition, instructions for applying the process query to the business process objects that have changed, instructions for publishing events when the results of executing the instructions for applying the process query are different from results of a previous execution of the instructions for applying the process query, and instructions for sending the events to a target process.

BRIEF DESCRIPTION OF THE DRAWING

The invention is described through a preferred embodiment and the attached drawing in which:

FIG. 4 is a display screen of the preferred embodiment showing a query's event structure.

GLOSSARY

Figure 1:
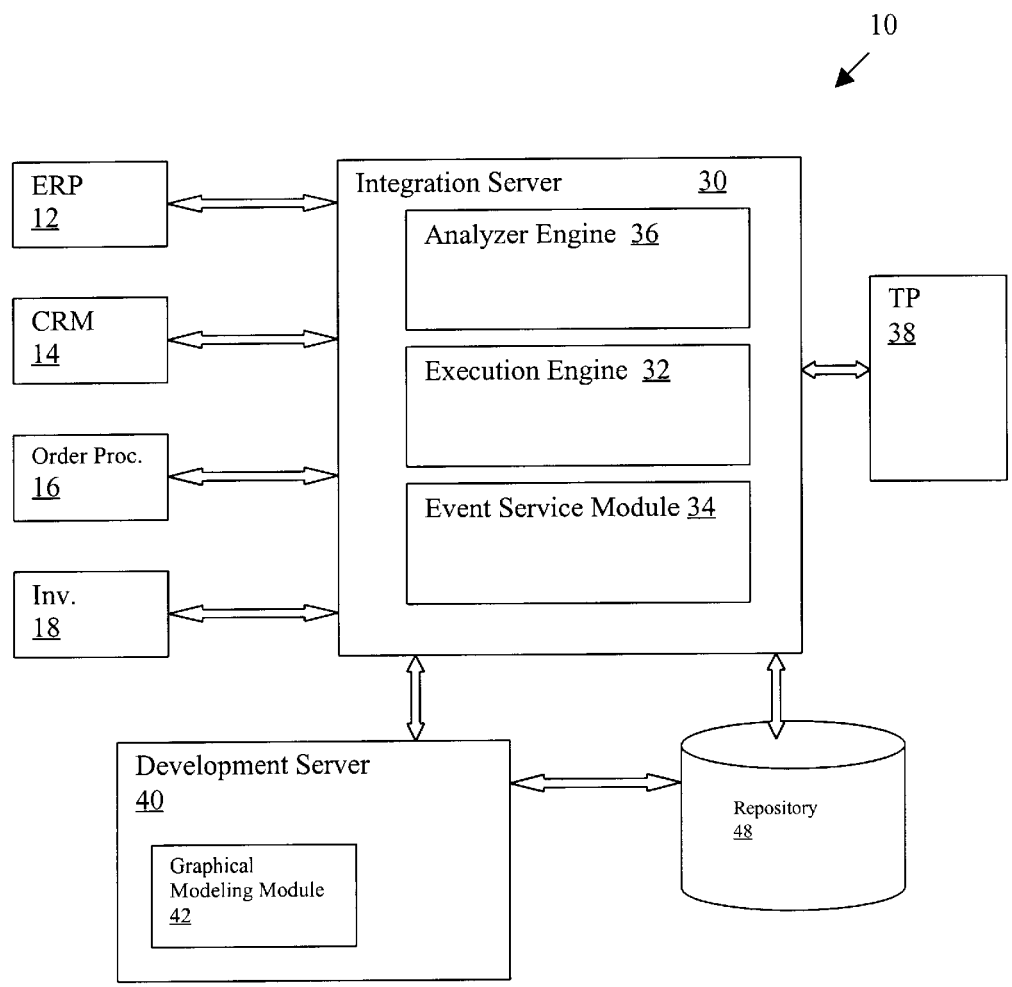
FIG. 1 is a block diagram of a computer architecture that can be used with a preferred embodiment of the invention.

The description herein utilizes terms of art which are defined below.

Common Object Request Broker Architecture (CORBA)—An architecture that enables pieces of programs, called objects, to communicate with one another regardless of what programming language they were written in or what operating system they're running on.

IDL—An Interface Definition Language used in CORBA to define distributed objects and services.

Query—An expression of one or more conditions under which data is to be passed on to a target and specification of the data.

Query Variable—A binding variable in a query denoting an expression to be applied to an attribute of a business process object in the query result.

Schema—The structural definition, i.e. description of the information model, of a document or message.

Service Level Agreement (SLA)—One or more parameters indicating limits of acceptable process execution.

Target—A downstream component for receiving events resulting from process queries.

Time Based Aggregation Expression—An expression that aggregates values of attributes of plural business process objects and current time.

Time Based Condition—A Boolean condition that operates on an attribute of a business process object with respect to current time, or a Boolean condition that contains a query variable bound to a time-based aggregation expression.

Transaction Commit—The function of an execution engine updating a group of business process objects simultaneously.

DETAILED DESCRIPTION

U.S. patent application Ser. No. 08/818,355, entitled Event Driven Communication System, filed Mar. 17, 1997, the disclosure of which is incorporated herein by reference, discloses a publish/subscribe event interface. The parent applications disclose a process for evaluating events furnished through such an interface using queries. This process eliminates many of the disadvantages associated with the use of a relational database. However, there is still a need for a more efficient way to process time related queries of business processes.

The event service is capable of publishing data changes conveyed in asynchronous messages called "events" to subscribers in near real time (or "business real time" as it is sometimes called) which is essentially the time required by a computing system to post the data over various communication channels supported by the event service. The event service described in the above-referenced patent application is an event-driven (or publish/subscribe) communications system in which data changes are published to subscribers at the time the changes occur. One or more devices subscribe to a channel and whenever data is published on the channel, the channel passes the published data to each of the subscribers to that channel. Publication of data to subscribers requires no explicit action by a subscriber in order to receive the data, other than a one time subscription action. A single publication from a publishing source to a channel publishes the data to all subscribers no matter how many subscribers are to receive the data. A single channel may receive data from a plurality of publishers and make the data available to one or more subscribers. Publish-subscribe communications are asynchronous and thus allow a publisher or a subscriber to be on-line or off-line as needed. If a subscriber disconnects, the subscriber may reconnect and receive all of the data which it missed up to some prescribed amount determined by the retention policy of the channel.

Event-driven communications provide essentially immediate data when an event creating the data occurs. A publish/subscribe system also permits periodic publication of data changes and thus is especially useful for both furnishing real-time data and for publishing the results provided by queries. While a publish/subscribe system is utilized for the event service in the preferred embodiment, there are many other ways known to those skilled in the art to accomplish the delivery of sequences of events which are within the teaching of the present invention (e.g., asynchronous messages delivered by message-oriented middleware). Accordingly, the term "publish," as used herein, refers to making information available in any manner.

FIG. 1 illustrates architecture 10 for developing, executing, and querying business process models in accordance with a preferred embodiment. Business process systems, such as ERP system 12, CRM system 14, order processing system 16, and inventory system 18 control associated business processes and are coupled to integration server 30 over a network or other communication channel. In addition, trading partner system 38, such as the integration server of a supplier or other external party, is coupled to integration server 30 over the Internet or other communication channel, such as a wide area network (WAN). Integration server 30 is coupled to development server 40 and repository 48 through appropriate communication channels such as a LAN. Repository 48 is illustrated as a separate device but can be embodied within integration server 30 or development server 40. Repository 48 includes a storage device for storing various objects and parameters and is described in detail in the application entitled Integrated Business Process Modeling Environment and Models Created Thereby and filed concurrently herewith.

Development server 40 includes graphical modeling module 42, in the form of software, which provides the modeling environment, including a user interface, for configuring business process models. Integration server 30 includes execution engine 32, also in the form of software, for executing business process models after deployment. For example, the modeling environment and execution engine can utilize Businessware™. Business process models are executed by execution engine 32 by directing the flow of information among the underlying internal and external systems 12, 14, 16, 18, and 36. After defining the business processes that need to be automated, a developer then creates graphical models of those processes with graphical modeling module 42. The resulting models consist of plural states and transitions representing the underlying business process, as described in detail below.

Integration server 30 also includes event service module 34 which serves as a messaging layer for execution engine 32 and analyzer engine 36, in the form of software (described below). For example, the event-driven publish/subscribe methodology described above can be deployed. In the case of communication with external systems, messaging module 34 can transform data into standard formats, such as XML or EDI, and transport the data in an encrypted form over networks using standard protocols such as HTTP, FTP and SMTP in a known manner. Integration server 30 further includes analyzer engine 36 for extracting data from the business process models executed by execution engine 32, passing the data to process queries, and executing process queries as described below.

Figure 2:
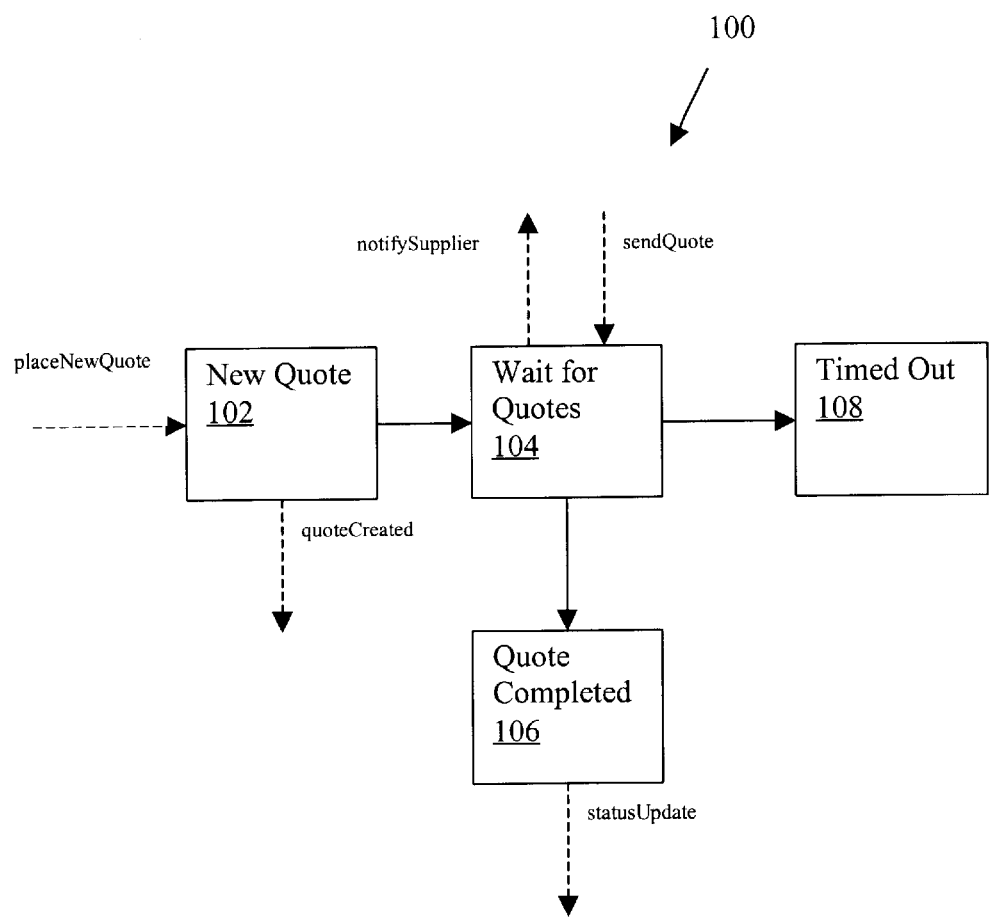
FIG. 2 is a graphical representation of a business process model example in accordance with the preferred embodiment.

FIG. 2 illustrates an example of a business process model that is executed by execution engine 32. Business process model 100 consists of four states, new quote state 102, wait for quote state 104, quote completed state 106, and timed out state 108. Transitions (illustrated as solid arrows between the states) connect the states as illustrated. Transitions define the logic that is executed to move an instance of the business process model, i.e. a business process object, from one state to the next state. Accordingly, transitions may have action code associated therewith. The action code can be any code that can be executed directly, compiled, translated, or otherwise processed for execution. For example, the action code can be a Java object. The corresponding business process object transitions through the states 102, 104, 106, and 108 in accordance with the action code in a known manner. Events (also indicated by dashed arrows) can be input to or output from states. For example, state 104 outputs a "notify suppliers" event and when a business process object enters the state receives a "send quote event" when a quote is received from a supplier.

Business process model 100 corresponds to a request for quote process. When a quote request is placed, the corresponding business process object, e.g. "ProductQuote" in this example, is created and enters a state 102. It also outputs an event of "quoteCreated" as a status event. The ProductQuote object changes to state 104 after it publishes a notifySupplier event. When suppliers receive this event, they will send their quotes with a sendQuote event. The ProductQuote object counts the supplier' replies, by incrementing an attribute currentReplies. After all quotes have been received, the ProductQuote object will be moved to state 106 and a statusUpdate event will be published to its subscribers. If the waiting time between publication of the notify supplier event and the receipt of the sendQuote event is longer than a prescribed time, the Business process object will transition to state 108.

A business process object can be defined in various forms. For example, an Interface Definition Language (IDL) can be used to define business process objects. The IDL code that defines a product quote process object, referred to as the "ProductQuote" herein, of business process model 100 of FIG. 2 is listed below.

```
module quoteObjects {
    struct Product {
        long product_id;
        string product_name;
    };
    struct SupplierQuote {
        string supplier_name;
        float price;
        boolean available;
    };
    typedef sequence<SupplierQuote> SupplierQuotes;
    // *** THE BPO IS DEFINED HERE ***
    interface ProductQuote: bpe::BusinessProcessObject {
        // *** Attributes ***
        attribute Product product;
        attribute SupplierQuotes supplierQuotes;
        attribute long currentReplies;
```

-continued

```
        // *** Methods ***
        void notifySuppliers( );
        void receiveQuotes(in bpe::BPID id,
            in string supplier_name,
            in float price,
    in boolean available);
    };
};
```

Business process objects can have attributes that describe the object. For example, the product quote object includes three attributes called "product," "supplierQuotes," and "currentReplies." The "attribute" portion of the business process object constitutes a source schema defining which data values of the business process object are available to a query. Business process objects can have any attributes, such product ID numbers, vendor ID numbers, or any type of data or metadata that may be useful.

Figure 3:
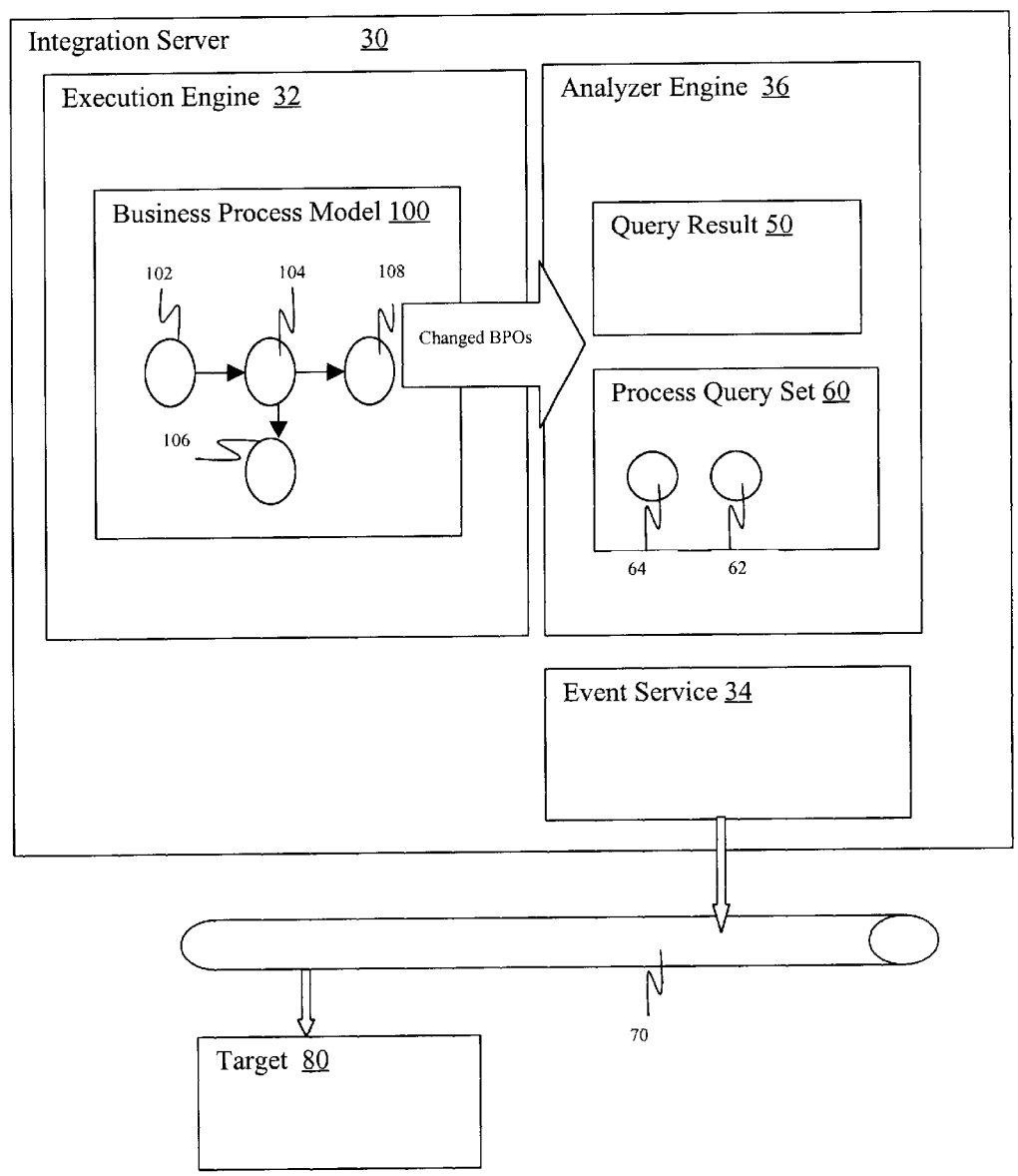
FIG. 3 is a schematic illustration of an integration server and other devices used in connection with the preferred embodiment.

FIG. 3 illustrates integration server 30 in a schematic manner. Business process model 100 is executed by execution engine 32. Analyzer engine 36 extracts data from execution engine 32 relating to the execution status of business process model 100. For example, execution engine 32 notifies analyzer engine 36 of state changes in business process objects when it commits the changes. Analyzer engine 36 then applies process queries in query set 60 to the business process objects that have changed and adds the results to query results 50 which can be stored in repository 48 or in any memory device.

Queries 62 and 64 are applied only to business process objects for which they are defined, as described below. Each query 62 and 64 then computes the changes in query results 50 as compared to a previous application of the queries. Each query then creates events for all changes in its results and the events are published by event service module 34 to channel 70. Target 80 subscribes to channel 70 in a known matter to thereby receive the events in substantially real time. Target 80 can be a business process model or other device, as described below. For example, events can be any one of "add," "change," and "delete" events as described in detail below.

Process queries can be grouped into process query models, i.e. plural queries associated with a business process object type. Process queries can be of several types. For example, a query can be a time based query which includes time based conditions with respect to the current time. Also, a query can be an aggregation query which computes aggregate values of objects attributes. A query also can be a simple filter query which determines whether an object satisfies certain conditions that are not based on the current time and do not include an aggregation function.

Queries can be generated using Object Query Language (OQL). For example, a query can be of the form of Query Example (1) below:

```
SELECT
    QuoteID: c.oid
    ProductName: c.product.product_id,
    ProductName: c.product.product_name
FROM
    c IN quoteObjects::ProductQuote
```

```
        WHERE
            (current_time – c.timeCreated) > 7000) AND
            (c.bpStateAT "WaitForQuote")
```

This query, referred to as the "long response query" herein, returns all business process objects of business process model 100 which are still in the wait for quote state 104 7000 milliseconds after creation of the business process object. Note that, in the preferred embodiment queries utilize the Backus-Naur syntax form listed in Appendix A attached hereto. However, any syntax can be used. A target schema can be created to describe the structure of change events that are published by analyzer engine 36 on behalf of a query. Each query of the preferred embodiment includes a "select" clause defining the data items to be included in the target schema. In the example of the long responses query above, the select clause states that the target schema includes three variables, "quoteID," "ProductID," and "Product-Name." Each change event generated by this query will contain the data that is defined by these three variables. Accordingly, the target will receive only the data that is defined by the target schema. Further, a query can include a "where" clause to remove specified business process objects from application to the query. A where clause can contain a logical expression of a time based filter condition which, if evaluated as false, will exclude the evaluated business process object. The "from" clause of the query specifies which business process objects are to be subjected to the query, i.e, the source of data.

As noted above, queries of the preferred embodiment can be classified into three categories. A "filter query" monitors individual business process objects to detect violation of conditions in the query. For example, a filter query might have a condition that all incoming orders must be processed in less than one hour. If a specific business process object, i.e. an order, does not reach the processed state within an hour, such a query will add a record to its result set. Note that result set 50 can comprise plural result sets corresponding to plural queries.

An "aggregate query" is performed on a related group of business process objects, as opposed to an individual business process object. Each record in a collection corresponding to an aggregate query is based on data gathered since the query began execution. An aggregate query is violated when a numeric quantity calculated from an aggregation of business process objects has crossed a predetermined threshold defined as a condition of the query. For example, a condition of an aggregate query may be that the system handles orders on average in under thirty minutes. If the average time to fill an order, i.e. the average time for business process objects to reach a state corresponding to a filled order, exceeds thirty minutes, such a query will add a record to its result set. An example of an aggregate query is found in Query Example (2) below.

```
    SELECT
        ProductID: c.product.product_id,
            AverageTime: AVG(current_time – c.timeCreated)
    FROM
        c IN quoteObjects::ProductQuote
```

```
    WHERE
        (c.bpState AT "QuoteCompleted")
    GROUP BY
        ProductID
    HAVING
        AverageTime > 600000
```

The query above groups all the business process object that have reached QuoteCompleted state 106 of business process model 100 by their ProductID parameter and, for each ProductID parameter, calculates a record that contains the ProductID parameter and the average time the system took to fulfill all the quotes that relate to that ProductID parameter. The query then returns only those records where the average time is greater than ten seconds (600,000 milliseconds). This query is an aggregate query because of the "AVG" function, which is computed as the average value of the quantity (current_time—c.timeCreated) for all the qualifying business process objects that have the same ProductID parameter. Note that this query is not applied to all business process objects because the "where" clause selects only those business process objects that are currently in QuoteCompleted state.

There are three "value functions" that are used in the select clause to create an aggregate query in the preferred embodiment. Of course, any type of calculation or other processing can be incorporated into a value function. The "sum" function returns the sum of a given parameter, or parameter-based expression, for all the business process objects that have been grouped together. The "avg" function returns the average value of a given parameter, or parameter-based expression, for all the business process objects that have been grouped together. The "count" function returns the number of business process objects that have been grouped together.

A "group by" clause can be used to cause the matching data to be organized by a given query variable. If the "group by" clause is present, a value function in the select clause causes all the records that have the same value in the "group by" field to be collapsed into one data record. A group by clause can list more than one query variable. If this is the case, the aggregate query adds one record to its collection for each unique combination of query variable values.

A "having" clause can be used to cause the expression following the having keyword to evaluate to a logical value, e.g., true or false. The only "variables" allowed in this expression are query variable that were defined in the select clause. The "having" clause can act as a final filter on the query. For a record to be included in the query's result, the expression in the having clause must evaluate to true.

Time-based queries, have a "current time" variable which returns the current "wall clock" time to permit the query result set to change with passage of time by comparing time attributes of a business process object with the current time. Time-related variables in such queries can be expressed in any time units and can be expressed in actual time, or time relative to a fixed time. In the preferred embodiment, time-based queries use the current time variable in the where clause. For example, query example (1) above creates records for business process objects that are still in the wait for quote state 7000 milliseconds after being created.

Significantly, time-based queries do not require a change in a business process object to cause change events to be published. In particular, because the where clause of a time-based query includes the current time variable, the value of any time-based query may change between true and false based on the passage of time alone. Keep in mind that, while the preferred embodiment only applies queries to changed business process objects, a query's result set can persist records corresponding to business process objects that have not changed in the last transaction commit. Accordingly, query results can include records corresponding to unchanged business process objects. A query can be both time-based and aggregate by using the current time variable inside a value function that is part of the "select" clause.

When a transaction commits, an epoch group, which represents the accumulated changes made to all business process objects since the last transaction commit, is sent to the analyzer engine 36. For each query, analyzer engine 36 computes the resulting changes, if any, to the query result associated with that query. The changes to each query's result are represented as a list of change events and are published to the appropriate query channel, channel 70 in the preferred embodiment.

In the preferred embodiment, the change events include "add," "change," and "delete" events. Event service module 34 of sends an add event when a new record needs to be added to the target collection. This event contains the data needed to add a new record to the collection. A change event is sent when an existing record in the target needs to be changed. This event contains a copy of the record before the change, plus a copy of the record after the change. A delete event is sent when a record needs to be deleted from the target collection. This event contains a copy of the record to be deleted. In the case of an aggregate query or a time-based query, analyzer engine 36 stores intermediate query results that enable it to keep each query's collection up to date with minimal computation. Accordingly, event service module 34 defines an event interface based on the query.

The structure of a query's change events is determined by the query's target schema. Each query can have its own set of change events, which can be different from the change events of any other query. The definitions of a query's change events can be embodied in an event interface named "queryName_Updates," where "queryName" is the name of the query in question. The structure of the events created by the long response query is shown in FIG. 4. The query's name is LongResponses, the name of the event interface is LongResponses_Updates. You can see that this event interface contains the "add," "change," and "delete" events. The event interface is thus generated from the query.

As illustrated in FIG. 4, the add and delete events of the preferred embodiment contain a parameter, named "obj." The change event of the preferred embodiment contains two parameters, named "oldObj" and "newObj." Each parameter includes appropriate variables to be transmitted with the event record in a tree structure. All of the parameters have the same data type, which is given by the query's name. The structure of these events is:

event void add(in LongResponses obj);
event void change(in LongResponses oldObj, in
LongResponses newObj);
event void delete(in LongResponses obj);

While the structure of the delete event of the preferred embodiment is identical to the structure of the add event, the change event contains two parameters, "oldObj" and "newObj," because it is notifying target 80 that an existing record in the collection (identified by "oldObj") should be changed to contain the information in "newObj." Each "obj" struct contains the data specified by the target schema for the query.

Using the sample aggregate query above to illustrate a change event, assume that this query's collection contains the record [4011, 7055], wherefore 4011 is the value of its ProductID field and 7055 is the value of its AverageTime field. Now assume that some time has passed and the value of AverageTime for the same product has changed to 6983, changing the record into [4011, 6983]. The query will publish a change event, since the change that has occurred is simply a change in one or more of the fields of the already existing collection record. The old value of the record is [4011, 7055], while the new value of the same record is [4011, 6983]. Analyzer engine 36 will set the value of oldObj to [4011, 7055] and the value of newObj to [4011, 6983]. Then it will publish the following change event to channel 70:

change(oldObj, newObj)

Target 80, i.e. a target process, upon receiving this change event, has the responsibility for finding the record [4011, 7055] and changing the value of the second field, AverageTime, from 7055 to 6983—in effect, the change event changes an existing collection record. For example, target 80 can be a business process model for enforcing a service-level agreement, that dictates a minimum level of service performance agreed to by trading partners. In addition to recreating the query's collection using the change events, target 80 can use the incoming change events in other manners to achieve any desired result.

Target 80 can use a subscriber program, i.e., a custom program that receives the change events published to channel 70. Further, target 80 can be a separate execution engine which can receive change events from channel 70 and enforce a service-level agreement. For example, target 80 may be configured to monitor business process model 100 for business process objects that have been in state 104 for more than seven seconds. To do this, a process model can be created to listen to channel 70 to which the long response query publishes events. Such a business process model would be designed to recreate the query's collection and react appropriately to each business process object represented by a record in the collection. If it were assumed that a business process object delayed for seven seconds indicates a serious error, one possible response would be for target 80 to send a pager message notifying the appropriate personnel of the problem. Target 80 can also be a portal or other system for displaying information.

Execution engine 32 is operatively coupled to analyzer engine 36 to permit initialization of business process objects. For example, upon initialization due to hardware boot up or the like, an initial collection of business process objects is computed and queries are applied to the initial collection before any state changes are published. This coordination establishes the initial query results which are needed for comparisons against subsequent query results computed by analyzer engine 36.

The invention can be used with any type of queries and can be applied to any type of business process. The invention can be implemented as software modules on any type of computer or computer system. For example, one or more general purpose programmable computers can be programmed to accomplish the functionality disclosed above. The invention can be used to generate any type of reports, or other actions in response to business process activity. Any type of programming languages, protocols, messaging standards and the like can be used to accomplish the invention. Queries can be constructed in any appropriate format. Queries can be embodied as components of an integration model as described in the concurrently filed application entitled Integrated Business Process Modeling Environment and Models Created Thereby The various functions and modules can be grouped in software or hardware in any matter.

The invention has been described through a preferred embodiment. However, various modifications can be made without departing from the scope of the invention as defined by the appended claims and legal equivalents thereof.

APPENDIX

| | The tables below define the subset of OQL that Business Ware uses for SLA queries. Here are some conventions that you should keep in mind:<br>The description of the query language grammar below uses the Backus-Naur Form syntax, which describes the syntax for tokens that combine with each other to create a valid top-level production. In this case, the top-level production is the *query* token. For details on how to read this notation, see the tutorial located at<br>http://braid.rad.jhu.edu/til/AboutBNF.html.<br>Text in italics represents a token and is not to be typed into a query. Tokens combine to create other tokens, with a fully formed query resulting from a *query* token. Text in bold, fixed-width font is part of the query. Text in square brackets is optional.<br>When a single or double non-alphabetic character string is meant to be part of a token, it is enclosed in double quotation marks. In the query itself, only strings and single-character constants are surrounded by double quotation marks. For example, the definition sum "("*expr*")" means the string "sum" followed by a left parenthesis, followed by whatever text is a valid *expr*, followed by a right parenthesis. The quotation marks exist only to alert you of the non-alphabetic character stringinthe.<br>The keywords in the tables below (represented with bold, fixed-width text) are shown using lowercase characters. However, these keywords are case-insensitive, and you can use either lowercase or uppercase letters. Note that this rule does not apply to the attributes mentioned earlier in this appendix. |
|---|---|
| *query* Defined | *query* : :=<br>select *selectDeclarationList* from *variableDeclarationList* [*whereClause*]<br>\|<br>select *selectDeclarationList* from *variableDeclarationList* [*whereClause*][group by *identifierList*][having *expr*]of |
| Explanation | This is the top-level production that represents a query. All queries must conform to one of the two forms listed in the definition above. The first form represents a filter query, while the second form represents an aggregate query.<br>In an aggregate query, for each "*alias: expr*" in the *selectDeclarationList*, one of the following must be true: either the alias name appears in the group by clause, or *expr* is a *valueFunction*. This means that if the group by clause is absent, every *expr* must be a *valueFunction*. |
| Examples | 1. This filter query returns the account number, customer name, and balance for all accounts with a negative balance:<br>    select acct :a.acctNum, name:a.custName, bal:a.balance<br>        from a in BankModule.Account<br>        where a.balance < 0<br>2. This aggregates query returns the account number and total balance of all accounts that have a combined balance of over $50,000.<br>    select myName:a.custName, totalBal:sum(a.balance)<br>        from a in BankModule.Account<br>        group by myName<br>        having totalBal > 50000 |
| *selectDeclarationList* Defined | *selectDeclarationList* : :=<br>*alias* ":" *expr*<br>\|<br>*selectDeclarationList* "," *alias* ":" *expr* |
| Explanation | This token represents the list of one or more data items to be returned in each query result. Each data item has an alias name (*alias*) and value (*expression*). |
| Examples | totalBal:sum(a.balance)<br>currBal:a.balance, alteredBal:a.balance −12.34 |
| *variableDeclarationList* Defined | *variableDeclarationList* : :=<br>*identifier* in *pathExpression* |
| Explanation | This token represents the named variable (*identifier*) that represents an individual BPO from the BPO data type being queried (*pathExpression*). |
| Examples | a in BankModule.Account |
| *identifier* Defined | see "Explanation" |
| Explanation | This token represents an arbitrary name (like a variable name) for data item you wish to refer to elsewhere. |
| Example | a (as in select . . . from a in Account) |
| *identifierList* Defined | *identifierList* ::= *identifier* "\|" *identifiert* "," *identifierList* |
| Explanation | This token occurs after the group by keyword. It lists one or more aliases by which intermediate results will be grouped. |
| Example | a (as in select . . . from a in Account) |
| *pathExpression* Defined | pathExpression : :=<br>*identifier*<br>\| |

APPENDIX-continued

| | |
|---|---|
| | pathIdentifier "." identifier |
| | pathIdentifier "->" identifier |
| Explanation | This token refers to a BPO data type or data within that data type. The dot operator (".") is used to separate the module name from the BPO name or to extract an element from within a BPO. The arrow operator ("->") is a synonym for the dot operator. |
| Examples | BankModule.Account |
| | BankModule.Account.balance |
| whereClause Defined | whereClause : := |
| | where expr |
| Explanation | This token expresses a condition that limits the results the query returns. The expr token must evaluate to either true or false. |
| Example | where a.balance > 5000 |
| | where (current_time - a.timeCreated) > 20 * 1000 |
| valueFunction Defined | valueFunction : := |
| | sum "("expr")" |
| | \| |
| | avg "("expr")" |
| | \| |
| | count "("expr")" |
| | \| |
| | count (*) |
| Explanation | This token returns a numeric value that is based on a series of BPO records that have been grouped together. When the argument of the function is expr, the function works on the named expression. When the function is "count (*)", this function returns the number of BPO records that have been grouped together. |
| Example | The following query returns, for each customer, the customer's name and the total of all that customer's accounts. |
| | select custName:a.custName, custTotal:sum(a.balance) |
| |     from a in BankModule::Account |
| |     group by custName |
| literal Defined | literal : := integerConstant / characterConstant / floatConstant / longConstant |
| | / stringConstant / current_time / true / false |
| Explanation | This token represents some kind of unchanging value. A characterConstant is a single character, surrounded by double quotes. A stringConstant is a series of characters, surrounded by double quotes. The last three possibilities, current_time, true, and false, are not tokens but are items to be entered, as-is, into the query. They represents the current time, a Boolean true value, and a Boolean false value. |
| Examples | 12345 (integer), "q" (character), 123.45 (float or long), "navy van" (string), current_time, true, false |
| expr Defined | expr : := |
| | literal / |
| | pathExpression / |
| | valueFunction \| |
| | "("expr")"\| |
| | "+" expr \| |
| | "-" expr \| |
| | expr "+" expr \| |
| | expr "-" expr \| |
| | expr "*" expr \| |
| | expr "/" expr \| |
| | expr "%" expr \| |
| | "!" expr \| |
| | not expr \| |
| | expr and expr \| |
| | expr or expr \| |
| | expr "=" expr \| |
| | expr "==" expr \| |
| | expr "!=" expr \| |
| | expr "<" expr \| |
| | expr ">" expr \| |
| | expr "<=" expr \| |
| | expr ">=" expr \| |
| | expr like expr \| |
| | expr at expr \| |
| | expr in expr \| |
| Explanation | This token defines how literals, path expressions, and value functions can be combined. Most of these combinations are obvious, but several require some explanation. to The "%" operator computes remainders; for example, 7 %3 = 1. The "=" and "==" operators both check for the equality of their two operands. In the case of logical operators (for example, and and not), the argument or arguments to these operators must be logical, not numeric or string, values. The like, at, and in operators are explained in "Notes on Selected Operators and Attributes" on page C-7. |
| Examples | (a.balance * 1.17) |
| | ! (a.bpState at "Wait_for_signal") |
| | totalBal - (a.balance / 2.0) |

What is claimed:

1. A method for monitoring a business process model in which at least one business process object transitions between states, said method comprising:
   (a) defining a process query having at least one state for the business process object and at least one time-based condition;
   (b) executing the business process model to cause business process objects to change;
   (c) applying the process query to business process objects that have changed;
   (d) publishing events when the results of said step (c) are different from results of a previous step (c);
   (e) sending the events to a target process; and
   (f) repeating said steps (b) through (e).

2. A method as recited in claim 1, wherein said step (a) comprises defining a query based on a time-based query language syntax.

3. A method as recited in claim 1, wherein said step (d) and said step (c) are executed periodically.

4. A method as recited in claim 1, wherein said step (d) and said step (c) are executed continuously.

5. The method as recited in claim 1, wherein said step (d) comprises publishing at least one of an add, change, and delete event to a channel.

6. The method as recited in claim 5, wherein said step (e) comprises subscribing the target process to the channel.

7. The method as recited in claim 6, wherein the target process is a data display engine.

8. The method as recited in claim 6, wherein the target process is a business process model.

9. The method as recited in claim 6, wherein said step (a) comprises generating a process query defining a violation of a service level agreement and the target process is a business process model for remedying the violation.

10. The method as recited in claim 1, wherein said step (d) is accomplished through an event interface generated from the process query.

11. The method as recited in claim 1, wherein said step (a) comprises generating a process query wherein the time-based condition is a time based aggregation condition in which a time based value is calculated from an attribute of a selected group of business process objects.

12. The method as recited in claim 1, wherein said step (a) comprises generating a process query wherein the time-based condition compares time attributes of a business process object to a current time.

13. The method as recited in claim 5, wherein the add event contains data to be added to a record of the target process.

14. The method as recited in claim 5, wherein the delete event contains data to be removed from a record of the target process.

15. The method as recited in claim 5, wherein the change event contains data indicating a change to a record of the target process.

16. The method as recited in claim 1, further comprising:
   (g) applying the process query to an initial collection of business process objects; and wherein, upon initialization, said step (b) is not executed until said step (g) is completed.

17. A computer architecture for monitoring a business process model in which at least one business process object transitions between states, said architecture comprising:
   an execution engine configured to execute business process models; and
   an analyzer engine configured to monitor state changes of business process models and to apply one or more queries to business process objects that have changed and to output events based on time-based conditions of the queries.

18. The architecture as recited in claim 17, further comprising means for defining the queries based on a time-based query language syntax.

19. The architecture as recited in claim 17, wherein said analyzer is configured to output the events by publishing at least one of an add, change, and delete event to a channel.

20. The architecture as recited in claim 19, further comprising a target process subscribing to the channel to thereby receive the events.

21. The architecture as recited in claim 20, wherein said target process is a data display engine.

22. The architecture as recited in claim 20, wherein said target process is a business process model.

23. The architecture as recited in claim 18, wherein said means for defining comprises means for generating a process query defining a violation of a service level agreement and wherein said target process is a business process model for remedying the violation.

24. The architecture as recited in claim 18, wherein said means for defining comprises means for generating a process query wherein the time-based condition is a time based aggregation condition in which a time based quantity is calculated from a selected group of business process objects.

25. The architecture as recited in claim 18, wherein said means for defining comprises means for generating a process query wherein the time-based condition compares time attributes of a business process to a current time.

26. The architecture as recited in claim 19, wherein the add event contains data to be added to a record of the target process.

27. The architecture as recited in claim 19, wherein the delete event contains data to be removed from a record of the target process.

28. The architecture as recited in claim 19, wherein the change event contains data indicating change to a record of the target process.

29. A computer readable media containing instructions for operation of a computer, said instructions comprising:
   instructions for monitoring a business process model in which at least one business process object transitions between states;
   instructions for defining a process query having at least one state for the business process object and at least one time-based condition;
   instructions for applying the process query to the business process objects that have changed; and
   instructions for publishing events when the results of executing the instructions for applying the process query are different from results of a previous execution of the instructions for applying the process query.

30. A computer readable media as recited in claim 29, further comprising instructions for defining the query based on a time-based query language syntax.

31. The computer readable media as recited in claim 29, wherein said instructions for publishing comprise publishing at least one of an add, change, and delete event to a channel.

32. The computer readable media as recited in claim 30, wherein said instructions for defining the query comprise instruction for generating a process query defining a violation of a service level agreement.

33. The computer readable media as recited in claim 30, further comprising instructions for generating an event interface from the process query.

34. The computer readable media as recited in claim 30, wherein said instructions for defining the query include instructions for defining the time-based condition as a time based aggregation condition in which a time based quantity is calculated from a selected group of business process objects.

35. The computer readable media as recited in claim 30, wherein said instructions for defining the query include instructions for defining a process query wherein the time-based condition compares time attributes of a business process object to a current time.

* * * * *